United States Patent
Nagamoto (10) Patent No.: US 11,413,963 B2
(45) Date of Patent: Aug. 16, 2022

(54) VEHICLE POWER SUPPLY SYSTEM (71) Applicant: TOYOTA JIDOSHA KABUSHIKI KAISHA, Toyota (JP)

(72) Inventor: Makoto Nagamoto, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 227 days.

(21) Appl. No.: 16/742,992

(22) Filed: Jan. 15, 2020

(65) Prior Publication Data
US 2020/0238829 A1 Jul. 30, 2020

(30) Foreign Application Priority Data

Jan. 30, 2019 (JP) .............................. JP2019-014149

(51) Int. Cl.
| | |
|---|---|
| *B60L 1/00* | (2006.01) |
| *B60L 50/60* | (2019.01) |
| *B60R 16/03* | (2006.01) |
| *B62D 5/04* | (2006.01) |
| *B60T 13/74* | (2006.01) |

(52) U.S. Cl.
CPC ................. *B60L 1/00* (2013.01); *B60L 50/66* (2019.02); *B60R 16/03* (2013.01); *B60T 13/74* (2013.01); *B62D 5/0457* (2013.01)

(58) Field of Classification Search
CPC ........ B60L 1/00; B60L 50/66; B60L 2240/52; B60L 58/20; B60L 1/12; B60L 1/003; B60L 3/0076; B60R 16/03; B60T 13/74; B62D 5/0457; Y02T 10/70; H02M 3/156; H02M 3/157
See application file for complete search history.

(56) References Cited

U.S. PATENT DOCUMENTS

| | | | |
|---|---|---|---|
| 2005/0254265 A1 | 11/2005 | Yamada | |
| 2007/0275276 A1* | 11/2007 | Saeki | H01M 8/04589 429/431 |
| 2012/0049774 A1 | 3/2012 | Takamatsu et al. | |
| 2012/0299377 A1 | 11/2012 | Masuda et al. | |
| 2012/0306263 A1* | 12/2012 | Tashiro | B60L 58/20 307/9.1 |
| 2017/0361824 A1* | 12/2017 | Rizzo | B60T 8/3265 |

FOREIGN PATENT DOCUMENTS

| | | |
|---|---|---|
| EP | 1536548 A1 | 6/2005 |
| EP | 2535218 A1 | 12/2012 |
| JP | 2003309997 A | 10/2003 |
| JP | 2007-239620 A | 9/2007 |

(Continued)

*Primary Examiner* — Lincoln D Donovan
*Assistant Examiner* — Alex W Lam
(74) *Attorney, Agent, or Firm* — Oliff PLC (57) ABSTRACT

A power supply system for a vehicle includes a high-voltage battery that supplies electric power to an on-vehicle motor, a low-voltage battery that supplies electric power to a plurality of on-vehicle auxiliary machines, a DC/DC converter that changes voltage of an output from the high-voltage battery and supplies the resulting output to the low-voltage battery, and a controller that detects a working state of at least one of the plurality of on-vehicle auxiliary machines and controls operation of the DC/DC converter in accordance with the detected working state.

6 Claims, 7 Drawing Sheets

(56) References Cited

FOREIGN PATENT DOCUMENTS

| | | |
|---|---|---|
| JP | 2008172955 A | 7/2008 |
| JP | 2008-289303 A | 11/2008 |
| JP | 2010-068611 A | 3/2010 |
| JP | 2010068576 A | 3/2010 |
| JP | 2010200534 A | 9/2010 |
| JP | 2011125144 A | 6/2011 |
| JP | 2011-239641 A | 11/2011 |
| JP | 2012-044805 A | 3/2012 |
| JP | 2014-045633 A | 3/2014 |
| JP | 2014-125044 A | 7/2014 |
| JP | 2017-192170 A | 10/2017 |
| JP | 2018-007446 A | 1/2018 |

* cited by examiner

VEHICLE POWER SUPPLY SYSTEM

CROSS REFERENCE TO RELATED APPLICATION

This application claims priority to Japanese Patent Application No. 2019-014149 filed on Jan. 30, 2019, which is incorporated herein by reference in its entirety including the specification, claims, drawings, and abstract.

TECHNICAL FIELD

The present disclosure relates to a vehicle power supply system including a DC/DC converter.

BACKGROUND

Vehicles having a high-power driving motor, such as electric vehicles (EV) and hybrid vehicles (HV), include, as their power source, a high-voltage battery of several hundred volts (V) or more. In contrast, electric power is supplied from an auxiliary machine battery of about 12V to auxiliary machines including on-vehicle electronic devices, lights, audio devices, air conditioner fans, radiator fans, an electrically controlled brake system, electrically-powered steering, and various control units. Automotive vehicles having an internal combustion engine such as a gasoline engine as a drive source include an alternator to charge the auxiliary machine battery with the output of the alternator. Patent Document 1 listed below discloses that an output of a high-voltage battery is supplied, via a DC/DC converter, to an auxiliary machine battery to charge the auxiliary machine battery.

CITATION LIST

Patent Literature

[Patent Document 1] JP 2017-192170 A

To achieve efficient driving of vehicles, it is desirable to reduce weight of devices mounted on vehicles. There has therefore been a demand for an auxiliary machine battery to also have a minimum battery capacitance.

Certain operations of on-vehicle auxiliary machines, particularly an actuator including a motor, may consume comparatively large electric current. Auxiliary machines that consume large electric current include, for example, an electrically controlled brake system and electrical power steering. At startup of these devices, the output electric current of the auxiliary machine battery changes significantly. Also, when two or more auxiliary machines are used simultaneously, the output electric current of the auxiliary machine battery is large. The output electric current of the auxiliary machine battery, which is large and changes by a significant amount, can decrease the output voltage of the auxiliary machine battery, which may make operations of various auxiliary machines supplied with electric power from the auxiliary machine battery become unstable.

SUMMARY

In accordance with an aspect of the disclosure, a power supply system for a vehicle includes a high-voltage battery that supplies electric power to an on-vehicle motor, a low-voltage battery that supplies electric power to a plurality of on-vehicle auxiliary machines, a DC/DC converter that changes voltage of an output of the high-voltage battery and supplies a resulting output to the low-voltage battery, and a controller that detects a working state of at least one of the plurality of on-vehicle auxiliary machines and controls operation of the DC/DC converter in accordance with the working state that is detected.

The plurality of on-vehicle auxiliary machines may include electric power steering, and the controller may detect the working state of the electric power steering based on a working signal of the electric power steering.

The plurality of on-vehicle auxiliary machine may include an electrically controlled brake system, and the controller may detect the working state of the electrically controlled brake system based on a working signal of the electrically controlled brake system.

The controller may perform voltage feedback control with respect to the DC/DC converter in accordance with an output voltage of the DC/DC converter, and when at least one of the plurality of on-vehicle auxiliary machine is working, the controller may raise control gain of the DC/DC converter.

The controller may perform voltage feedback control with respect to the DC/DC converter in accordance with an output voltage of the DC/DC converter, and when at least one of the plurality of on-vehicle auxiliary machines is working, the controller may perform current feedback control with respect to the DC/DC converter in accordance with an output current of the DC/DC converter. A target output current of the current feedback control may be obtained by adding working currents of the at least one on-vehicle auxiliary machine that is working.

The controller may perform feedback control with respect to the DC/DC converter in accordance with an output voltage and an output current of the DC/DC converter, and a target output current of the feedback control may be obtained by adding working currents of the at least one on-vehicle auxiliary machine that is working. The power supply system according to the disclosure, which controls the output of the DC/DC converter in accordance with the working state of the auxiliary machine, can prevent decrease in the voltage supplied to the auxiliary machine.

BRIEF DESCRIPTION OF DRAWINGS

Embodiment(s) of the present disclosure will be described based on the following figures, wherein.

DESCRIPTION OF EMBODIMENTS

Embodiments of the disclosure will be described hereinafter by reference to the drawings. The disclosure is not limited to the embodiments described herein.

<Entire Structure of System>

Figure 1:
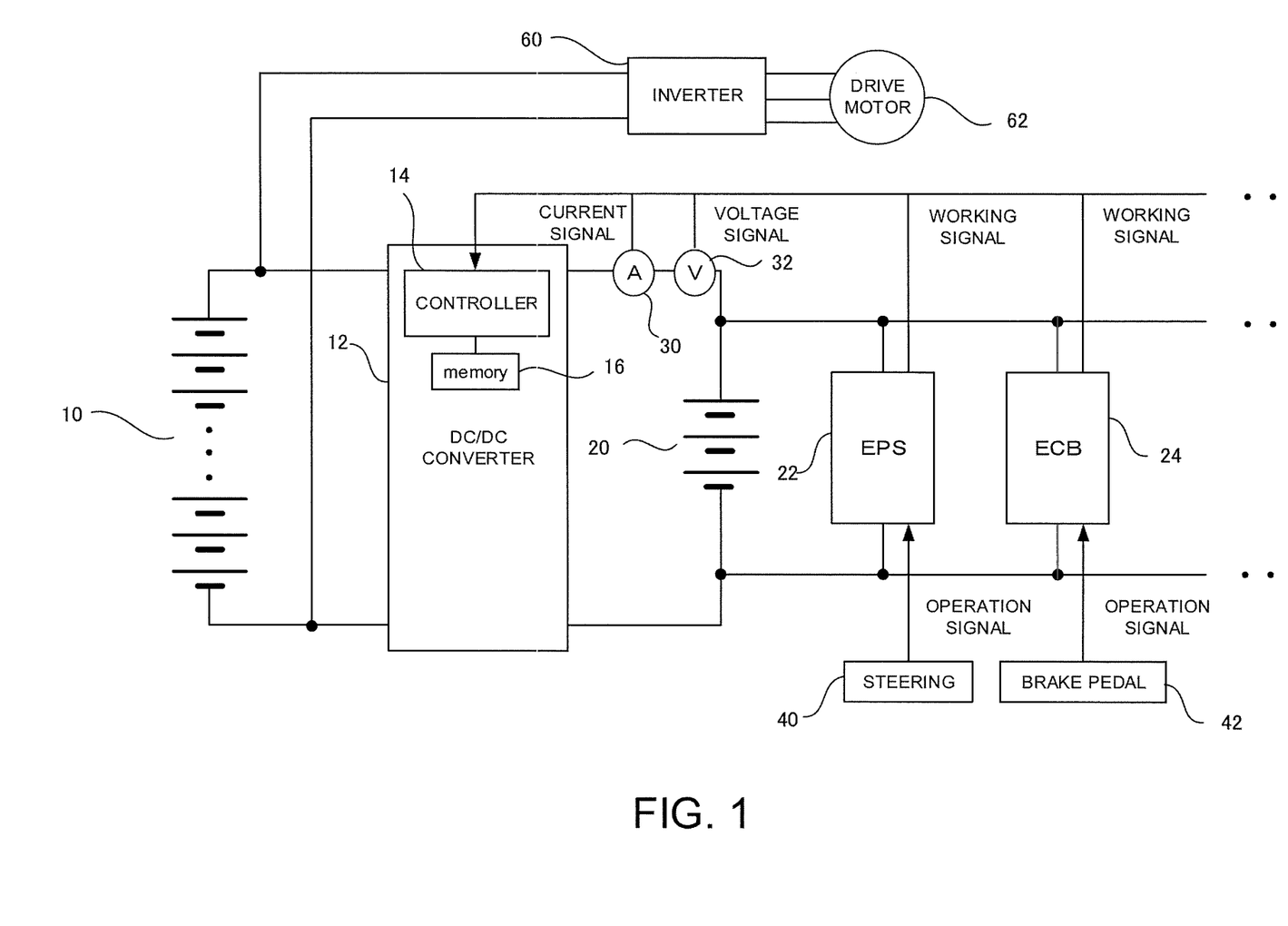
FIG. 1 illustrates an overall structure of a power supply system according to an embodiment.

FIG. 1 illustrates an overall structure of a power supply system according to an embodiment. This power supply system is mounted in EVs or HVs. A high-voltage battery 10 is formed by a secondary battery such as a lithium ion battery, and outputs voltage of about several hundred volts (V). An inverter 60 is connected with the high-voltage battery 10, and converts direct-current electric power to alternating-current electric power. The inverter 60 is connected with a drive motor 62 of large output, and the vehicle travels by the output from the drive motor 62. In this illustrated example, the drive motor 62 is a three-phase alternating current motor.

The high-voltage battery 10 is connected with an input side of a DC/DC converter 12. DC/DC converters of various types may be employed. The DC/DC converter 12 includes a bridge circuit including a plurality of switching elements and a condenser on the output-side, maintains condenser voltage at about 14V by switching the plurality of switching elements, and outputs the condenser voltage as an output of the DC/DC converter 12.

The DC/DC converter 12 includes a controller 14 and a memory 16. The controller 14 controls switching of the switching elements disposed therein such that the output voltage is a predetermined target voltage. The memory 16 stores data necessary for the control of the DC/DC converter 12.

A low-voltage battery 20 is connected with the output side of the DC/DC converter 12. The low-voltage battery 20 supplies electric power to various auxiliary machines mounted on the vehicle. FIG. 1 illustrates electric power steering (EPS) 22 and an electronically controlled brake system (ECB) 24 as auxiliary machines connected with the low-voltage battery 20.

An ammeter 30 and a voltmeter 32 are disposed along the output line of the DC/DC converter 12 to detect an output current and an output voltage, respectively. A current signal and a voltage signal detected by the ammeter 30 and the voltmeter 32 are supplied to the controller 14. Working signals indicative of the working states of the electric power steering 22 and the electrically controlled brake system 24, respectively, are further supplied to the controller 14.

An operation signal of steering 40 is supplied to the electric power steering 22, which controls steering of the vehicle based on the operation signal. An operation signal of a brake pedal 42 is supplied to the electrically controlled brake system 24, which controls braking of the vehicle based on the operation signal.

<Control of DC/DC Converter 12>

Figure 2:
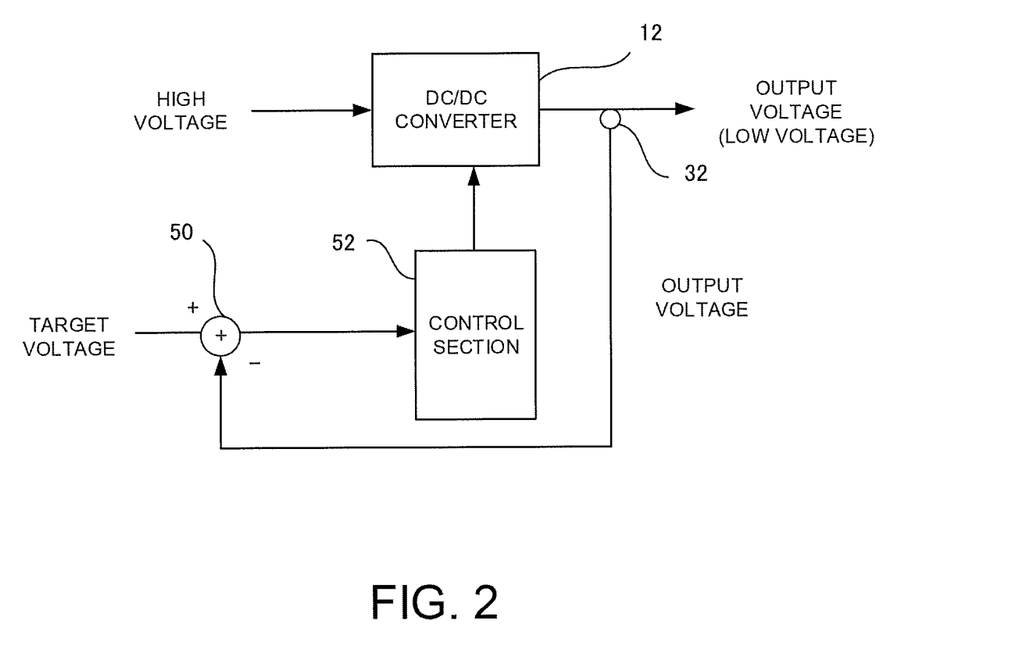
FIG. 2 illustrates a structure of control at the time of normal operation (voltage feedback control)

The operation of the controller 14 in the DC/DC converter 12 will be described. At the time of normal operation FIG. 2 illustrates a structure of control (voltage feedback control) at the time of normal operation. A voltage signal concerning the output voltage of the DC/DC converter 12 detected by the voltmeter 32 is supplied to an adder 50. The adder 50 calculates an error of the voltage signal with respect to a target voltage (e.g., 14V) also supplied thereto. The calculated error is then supplied to a control section 52. The control section 52 calculates a command value of a duty ratio for switching in the DC/DC converter 12, which is necessary for cancelling the error, and supplies the command value to the DC/DC converter 12. The DC/DC converter 12 controls switching based on the command value to thereby control the output voltage to the target voltage.

The control section 52 performs proportional, integral, and derivative (PID) control, for example. An increase of control gain in this control accelerates a response to an error but makes overshooting more likely to occur.

<Change of Control Gain>

Figure 3:
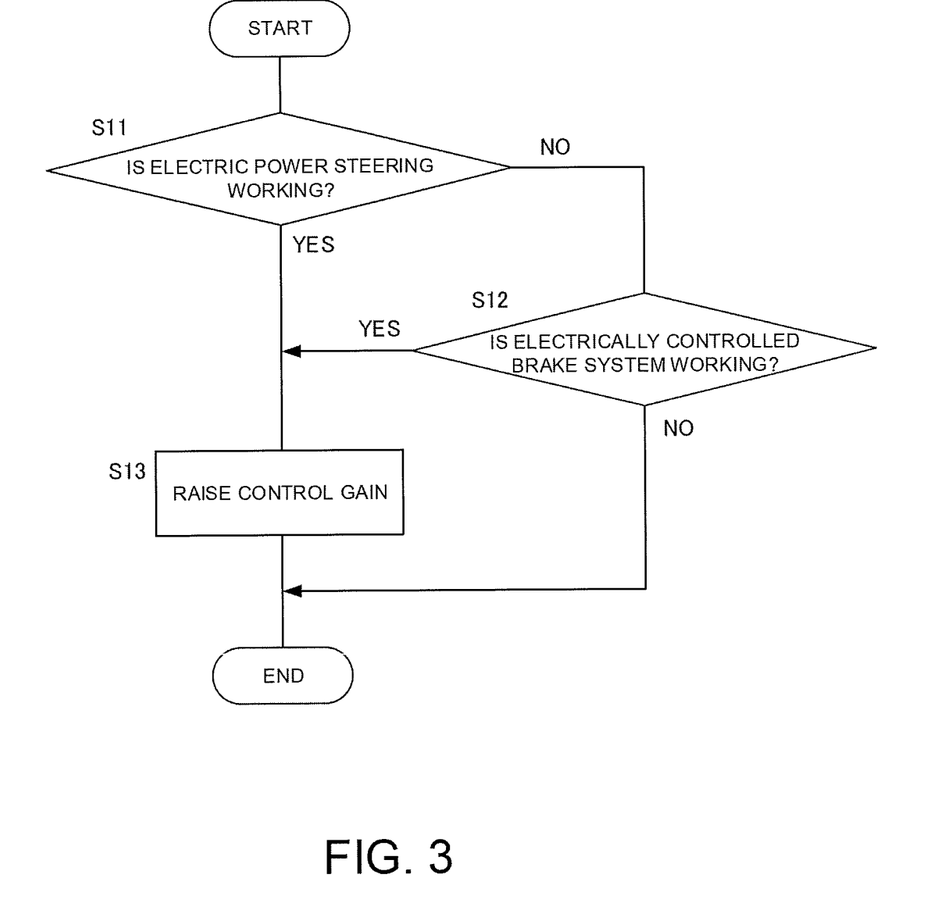
FIG. 3 is a flowchart illustrating control performed when both electric power steering and an electrically controlled brake system operate simultaneously.

FIG. 3 is a flowchart illustrating control performed when both the electric power steering and the electrically controlled brake system operate simultaneously.

It is first determined, based on a working signal of the electric power steering 22, whether or not the electric power steering 22 is working (S11). An operation signal of the steering 40 may be used as the working signal. If the result of determination in step S11 is NO, it is then determined whether or not the electrically controlled brake system 24 is working based on a working signal of the electrically controlled brake system 24 (S12). Here, the working signal may be an operation signal of the brake pedal 42.

If the result of determination in step S11 or step S12 is YES, one of the electric power steering 22 or the electrically controlled brake system 24 is working. In this case, there is a possibility that the output current from the low-voltage battery 20 will increase and the output voltage thereof significantly decrease. Therefore, the control gain of the voltage feedback control in the DC/DC converter 12 is raised (S13). This control improves responsiveness of the DC/DC converter 12 such that, when the output voltage starts to decrease, the output current increases immediately to thereby prevent decrease of the voltage. In particular, by raising the control gain upon generation of a working signal, the output of the DC/DC converter 12 can be increased in response to an increase in the amount of electric current caused by the operation of the auxiliary machine, thereby preventing decrease of the voltage.

If two or more auxiliary machines that consume comparatively large amount of electric current are working, the control gain may be changed. Further, as the consumed electric current is typically known in advance for each auxiliary machine, a corresponding raising amount of the gain may be prestored in the memory 16 in accordance with working of each auxiliary machine, and the control gain may be raised by a corresponding amount in accordance with working of each auxiliary machine.

<Shift to Current Control>

Figure 4:
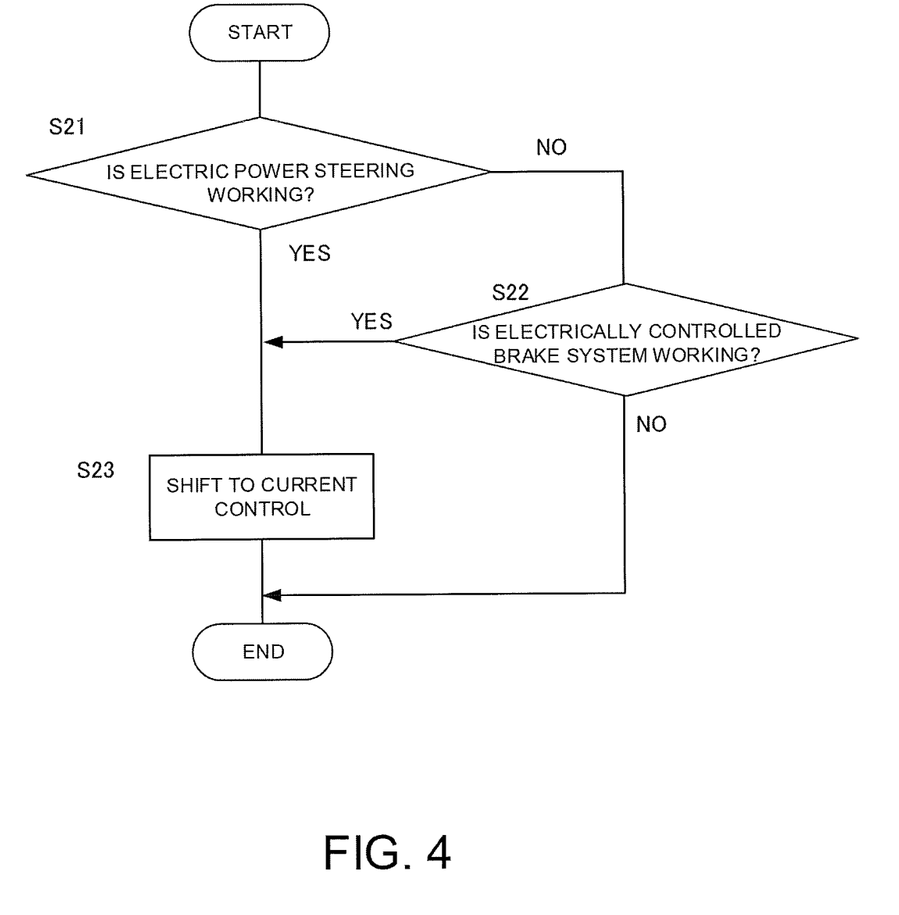
FIG. 4 is a flowchart illustrating other control performed when both electric power steering and an electrically controlled brake system operate simultaneously.

FIG. 4 is a flowchart illustrating other control performed when both the electric power steering 22 and the electrically controlled brake system 24 operate simultaneously.

In this example, whether or not the electric power steering 22 and the electrically controlled brake system 24 are working is determined (S21 and S22), and if one of them is working, control shifts to current control (S23). Specifically, while the voltage feedback control in accordance with the output voltage of the DC/DC converter 12 is normally performed, when the electric power steering and the electrically controlled brake system are working, current feedback for maintaining the output current of the DC/DC converter 12 at a predetermined value is performed. In particular, by shifting control to the current control upon generation of a working signal, responsiveness of the DC/DC converter 12 can be improved in response to an increase in the amount of electric current caused by the operation of the auxiliary machine, thereby preventing decrease of the voltage. The shift to the current feedback may be performed when both the electric power steering 22 and the electrically controlled brake system 24 are working or when two or more auxiliary machines are working simultaneously.

<Current Feedback Control>

Figure 5:
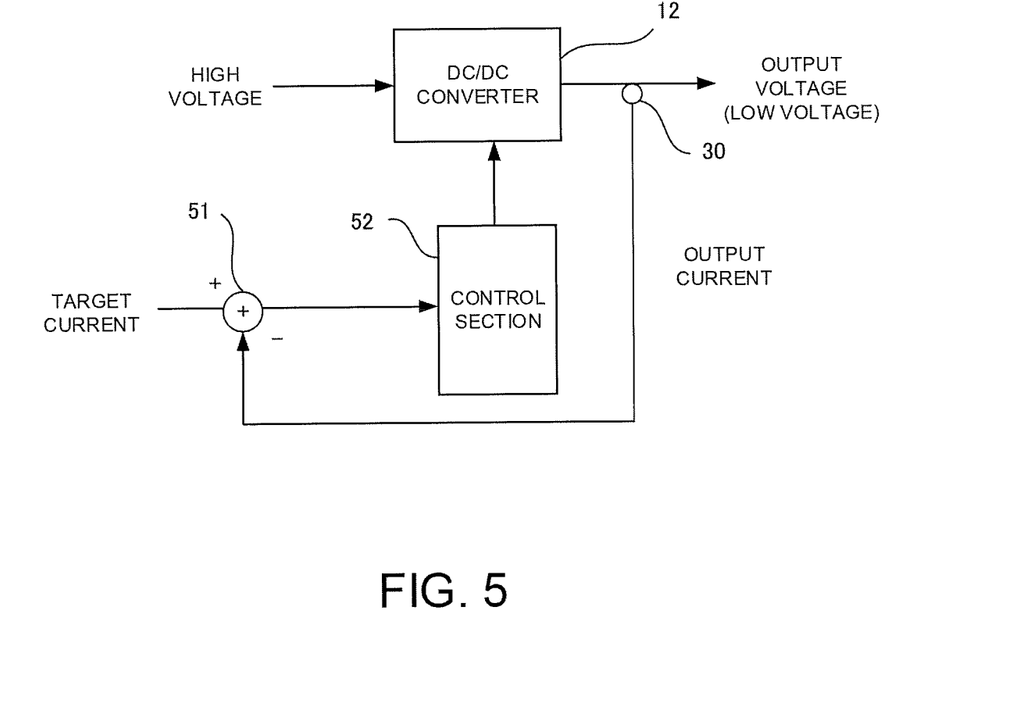
FIG. 5 illustrates a structure of current feedback control.

FIG. 5 illustrates a structure of the current feedback control. A current signal concerning an output current of the DC/DC converter 12 detected by the ammeter 30 is supplied to an adder 51. The adder 50 calculates an error of the current signal with respect to a target current also supplied thereto.

The output current which is required varies in accordance with the working state of the auxiliary machine. The memory 16 stores required currents in accordance with the working state of each auxiliary machine. In accordance with a working signal supplied from each auxiliary machine, electric current which is required is calculated each time to determine the target current. The target current need not be calculated in accordance with the working states of all auxiliary machines, and may be calculated only for auxiliary machines consuming large current while working, such as the electric power steering 22 and the electrically controlled brake system 24, for example.

The calculated error is supplied to the control section 52. The control section 52 further calculates a command value of a duty ratio for switching in DC/DC converter 12, which is required for canceling the error, and supplies the command value to the DC/DC converter 12. The DC/DC converter 12 controls switching in accordance with the command value such that the output current is controlled to the target current. The control section 52 may perform PID control, as described above.

<Voltage/Current Feedback Control>

Figure 6:
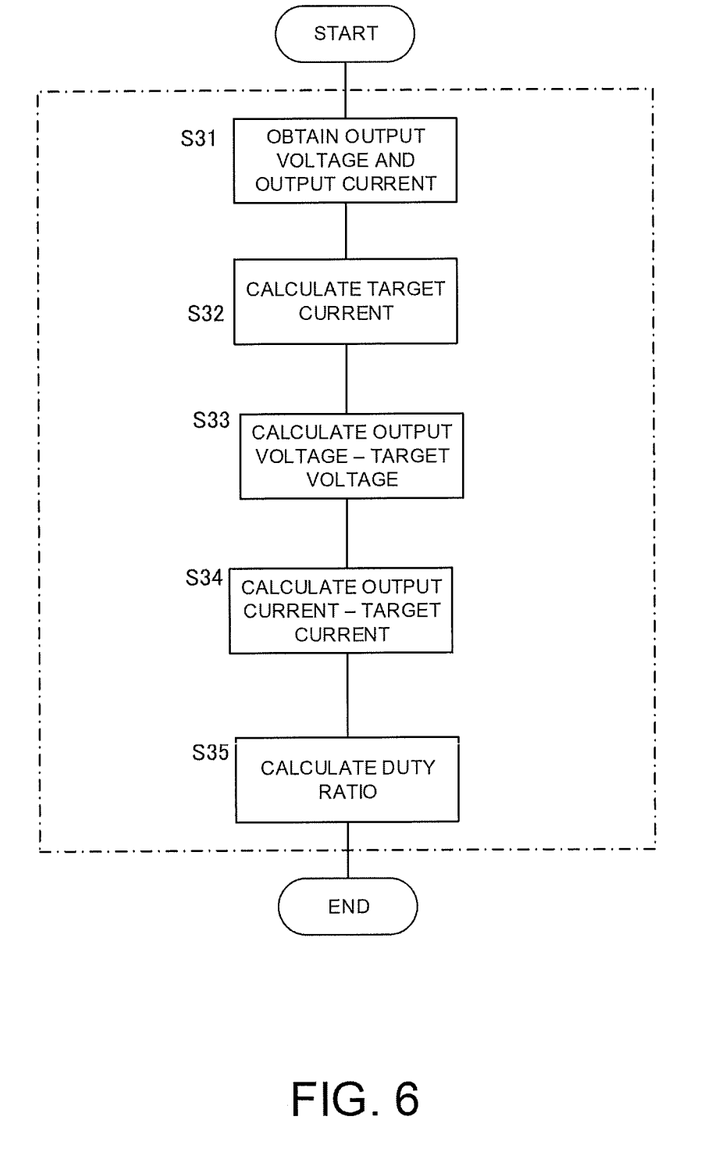
FIG. 6 is a flowchart illustrating an operation performed when voltage feedback and current feedback is performed.

FIG. 6 is a flowchart illustrating an operation when normal voltage feedback and current feedback control is performed. First, the output voltage and the output current of the DC/DC converter 12 are obtained (S31). Then, the target current is calculated (S32). An error between the output voltage and the target voltage and an error between the output current and the target current are then calculated respectively (S33, S34), and duty ratios of switching in the DC/DC converter 12 are calculated in accordance with the calculated errors (S35). Of the calculated duty ratios, the larger one (the one which results in a larger output) may be employed. This processing may maintain the output voltage by current feedback control when the output current increases rapidly. Alternatively, the two duty ratios calculated based on the voltage error and the current error may be added with weighting, to determine the duty ratio which is actually used. Further, the voltage and current control which is normally performed may be shifted to the current control upon start of using an auxiliary machine with large output current. In this case, control can be changed quickly by setting the weight for current control to 1 and setting the weight for voltage control to 0.

<Calculation of Target Current>

Figure 7:
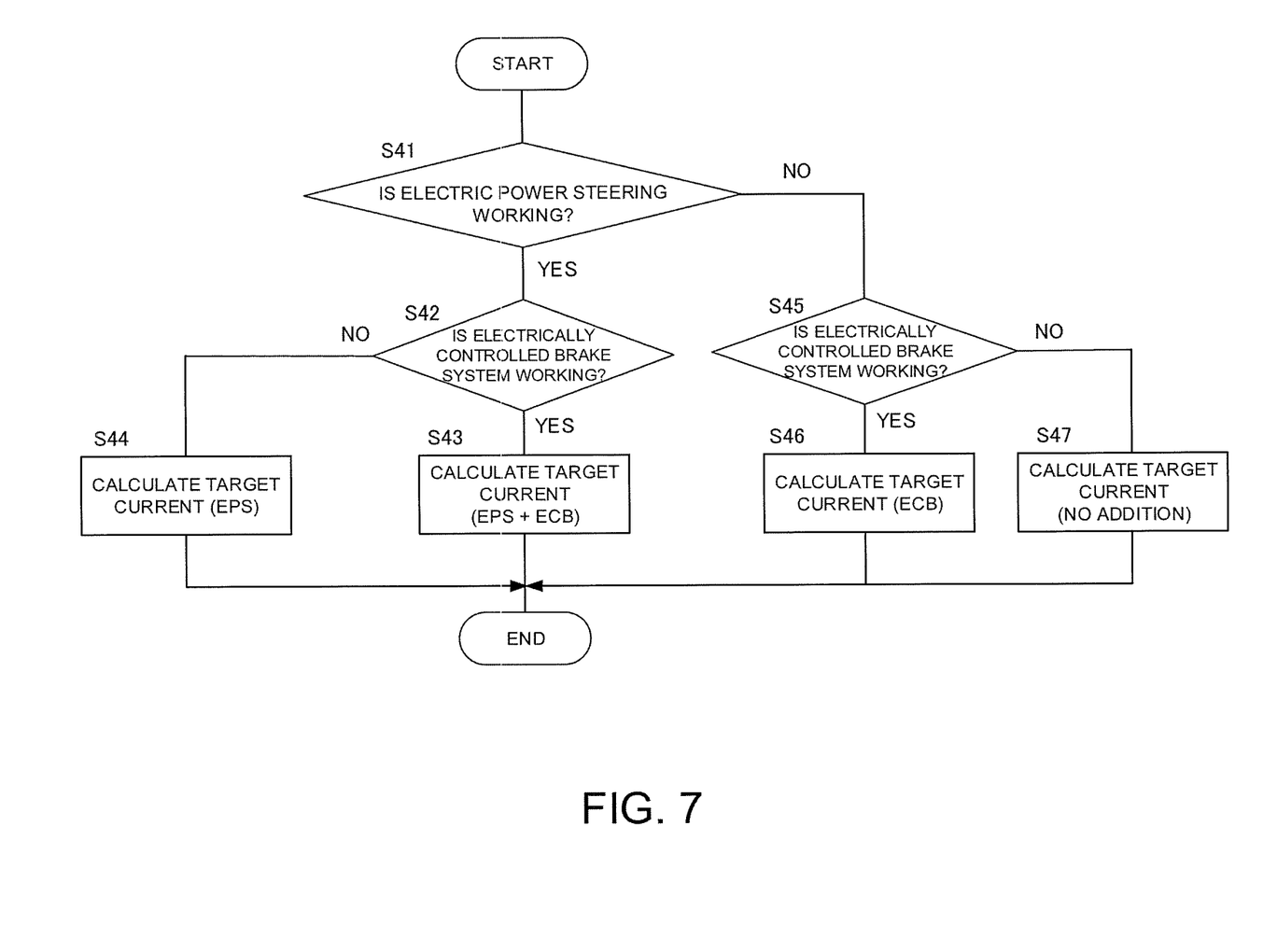
FIG. 7 is a flowchart illustrating setting of a target current in accordance with operations of the electric power steering and the electrically controlled brake system.

FIG. 7 is a flowchart for setting the target current in accordance with the operations of the electric power steering 22 and the electrically controlled brake system 24. In this example, whether or not the electric power steering 22 is operating is first determined (S41). If the determination result is YES in step S41, it is further determined whether or not the electrically controlled brake system 24 is working (S42). If the result is YES in the determination step S42, the sum of the working currents of the electric power steering 22 and the electrically controlled brake system 24 stored in the memory 16 is added to the target current at the time of normal operation to calculate the target current (S43). The target current at the time of normal operation as used herein refers to a target current obtained when neither the electric power steering 22 or the electrically controlled brake system 24 is working. If the result is NO in the determination step S42, the target current at the time of normal operation is added to the sum of the working currents of the electric power steering 22 stored in the memory 16 to calculate the target current (S44).

If the result is NO in the determination step S41, whether or not the electrically controlled brake system 24 is working is determined (S45). If the result is YES in this determination step S45, the target current at the time of normal operation is added to the sum of the working currents of the electrically controlled brake system 24 stored in the memory 16 to calculate the target current (S46). If the result is NO in the determination step S45, the target current at the time of normal operation is set as the target current without performing addition (S47). The range of the subject auxiliary machines may be widened and the output of the DC/DC converter 12 may controlled to comply with the operation states of these auxiliary machines in accordance with the working state of these auxiliary machines.

The invention claimed is:

1. A power supply system for a vehicle, comprising:
a high-voltage battery that supplies electric power to an on-vehicle motor;
a low-voltage battery that supplies electric power to a plurality of on-vehicle auxiliary machines;
a DC/DC converter that changes voltage of an output of the high-voltage battery and supplies a resulting output to the low-voltage battery; and
a controller that:
   detects a working state of at least one on-vehicle auxiliary machine of the plurality of on-vehicle auxiliary machines and controls operation of the DC/DC converter in accordance with the working state that is detected;
   performs voltage feedback control with respect to the DC/DC converter in accordance with an output voltage of the DC/DC converter, wherein
   the at least one on-vehicle auxiliary machine includes electric power steering and an electrically controlled brake system; and
   when at least one of working signals of the electric power steering and the electrically control brake system is detected, raises control gain of the DC/DC converter.

2. The power supply system according to claim 1, wherein the controller detects the working state of the electric power steering based on a working signal of the electric power steering.

3. The power supply system according to claim 1, wherein the controller detects the working state of the electrically controlled brake system based on a working signal of the electrically controlled brake system.

4. The power supply system according to claim 1, wherein the controller detects the working state of the electric power steering based on a working signal of the electric power steering and detects the working state of the electrically controlled brake system based on a working signal of the electrically controlled brake system.

5. The power supply system according to claim 1, wherein when at least one of the plurality of on-vehicle auxiliary machines is working, the controller performs current feedback control with respect to the DC/DC converter in accordance with an output current of the DC/DC converter, a target output current of the current feedback control being obtained by adding working currents of the at least one on-vehicle auxiliary machine that is working.

6. The power supply system according to claim 1, wherein the controller performs feedback control with respect to the DC/DC converter in accordance with the output voltage and an output current of the DC/DC converter, a target output current of the feedback control being obtained by adding working currents of the at least one on-vehicle auxiliary machine that is working.

* * * * *